(12) United States Patent
Hu et al.

(10) Patent No.: US 9,391,846 B2
(45) Date of Patent: Jul. 12, 2016

(54) POLICY FORMULATING METHOD, POLICY SERVER, AND GATEWAY

(71) Applicant: Huawei Technologies Co., LTD, Shenzhen (CN)

(72) Inventors: Yusheng Hu, Beijing (CN); Xiang Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 517 days.

(21) Appl. No.: 13/891,405

(22) Filed: May 10, 2013

(65) Prior Publication Data
US 2013/0254370 A1    Sep. 26, 2013

Related U.S. Application Data

(63) Continuation of application No. PCT/CN2011/074832, filed on May 28, 2011.

(30) Foreign Application Priority Data

Nov. 11, 2010   (CN) .......................... 2010 1 0542490

(51) Int. Cl.
*G06F 15/173*   (2006.01)
*H04L 12/24*   (2006.01)
(Continued)

(52) U.S. Cl.
CPC ............... *H04L 41/50* (2013.01); *H04L 12/14* (2013.01); *H04L 12/1407* (2013.01);
(Continued)

(58) Field of Classification Search
CPC ..... H04L 12/24; H04L 41/50; H04L 41/0893; H04L 12/1407; H04L 12/14; H04L 41/5029; H04L 67/30; H04L 67/303
See application file for complete search history.

(56) References Cited

U.S. PATENT DOCUMENTS

| 2003/0037128 A1* | 2/2003 | Beadles | ............. H04L 29/06 709/220 |
| 2003/0154404 A1* | 8/2003 | Beadles | ............. H04L 63/20 726/1 |

(Continued)

FOREIGN PATENT DOCUMENTS

| CN | 1026800 A | 8/2007 |
| CN | 101026800 A | 8/2007 |

(Continued)

OTHER PUBLICATIONS

First Office Action with Partial Translation of Chinese Application No. 201010542490.X, mailed Jul. 2, 2012, 19 pages.
(Continued)

*Primary Examiner* — Benjamin M Thieu
(74) *Attorney, Agent, or Firm* — Slater Matsil, LLP

(57) ABSTRACT

The policy formulating method includes: receiving, by a policy server, User-Agent user-agent information sent by a gateway, where the User-Agent information carries type information of a terminal or type information of a browser used by a terminal; determining, by the policy server, a type of the terminal according to the User-Agent information; and formulating, by the policy server, a charging policy and/or a QoS quality of service policy according to the type of the terminal. Type information of a user terminal or type information a browser used by a terminal is reported to a policy server; the policy server is capable of correctly distinguishing a terminal type, for example a mobile phone or a PC is surfing the Internet, and then the policy server formulates a corresponding policy to implement Internet access charging and QoS guarantee.

14 Claims, 4 Drawing Sheets

(51) Int. Cl.
  *H04L 12/14* (2006.01)
  *H04M 15/00* (2006.01)
  *H04W 4/24* (2009.01)
  *H04L 29/08* (2006.01)

(52) U.S. Cl.
  CPC ....... *H04L 41/0893* (2013.01); *H04L 41/5029* (2013.01); *H04L 67/30* (2013.01); *H04L 67/303* (2013.01); *H04M 15/66* (2013.01); *H04M 15/752* (2013.01); *H04W 4/24* (2013.01)

(56) References Cited

U.S. PATENT DOCUMENTS

| | | | | |
|---|---|---|---|---|
| 2009/0285201 | A1* | 11/2009 | Ben-Haim | H04L 12/66 370/352 |
| 2009/0285225 | A1 | 11/2009 | Dahod | |
| 2010/0043053 | A1 | 2/2010 | Wei et al. | |
| 2011/0314145 | A1* | 12/2011 | Raleigh | H04L 41/0893 709/224 |

FOREIGN PATENT DOCUMENTS

| | | |
|---|---|---|
| CN | 101043344 A | 9/2007 |
| CN | 101119211 A | 2/2008 |
| CN | 101163336 A | 4/2008 |
| CN | 101325780 A | 12/2008 |
| CN | 101605364 A | 12/2009 |
| CN | 101692727 A | 4/2010 |
| CN | 101800967 A | 8/2010 |
| CN | 101835134 A | 9/2010 |
| CN | 101977239 A | 2/2011 |
| EP | 2480015 A1 | 7/2012 |
| EP | 2627032 A4 | 8/2013 |
| WO | 0167716 A1 | 9/2001 |
| WO | 2009051527 A1 | 4/2009 |

OTHER PUBLICATIONS

Second Office Action with Partial Translation of Chinese Application No. 201010542490.X, mailed Feb. 27, 2013, 22 pages.
Rejection Decision of Chinese Application No. 201010542490.X with partial translation, mailed Jul. 25, 2013, 22 pages.
Extended European Search Report for Application No. 11777258.2-1862, mailed Jul. 3, 2013, 8 pages.
International Search Report and Written Opinion for Application No. PCT/CN2011/074832, mailed Sep. 1, 2011, 4 pages.
Berners-Lee, et al., Request for Comments 1945, "Hypertext Transfer Protocol—HTTP/1.0," May 1996, 64 pages.
Vodafone, "Pseudo-Cr TO Pdp Context Activation procedures for SAE/LTE in 23.060," 3GPP TSG SA WG2 Meeting #62, TD S2-080544, Marina Del Rey, CA, Jan. 14-18, 2008, 8 pages.
Telefonica SA: "Terminal + Removable Modem Issue," OMA-CDM-2007-0007-INP, Aug. 14, 2007, 5 pages.
"Http header User-Agent for detecting browser browser type including mobile browsers," The Web Goodies, retrieved from Internet URL: http://www.thewebgoodies.com/2010/10/19/http-header-user-agent-for-detecting-browser-type-including-mobile-browsers/, Oct. 19, 2010, XP055025111, 3 pages.

* cited by examiner

POLICY FORMULATING METHOD, POLICY SERVER, AND GATEWAY

CROSS-REFERENCE TO RELATED APPLICATIONS

This application is a continuation of International Application No. PCT/CN2011/074832, filed on May 28, 2011, which claims priority to Chinese Patent Application No. 201010542490.X, filed with the Chinese Patent Office on Nov. 11, 2010 and entitled "POLICY FORMULATING METHOD, POLICY SERVER, AND GATEWAY", both of which are incorporated herein by reference in their entireties.

TECHNICAL FIELD

The present invention relates to the field of communications technologies, and in particular, to a policy formulating method, a policy server, and a gateway.

BACKGROUND

In 3GPP (3rd Generation Partnership Project, 3rd Generation Partnership Project) protocol specifications, an IMEISV (International Mobile Station Equipment Identity and Software Version Number, international mobile station equipment identity and software version number) can be used to report a type of a terminal.

Specifically, a packet sent by a terminal may carry the IMEISV to a GGSN (Gateway GPRS Support Node, gateway GPRS support node), the GGSN sends the IMEISV to a PCRF (Policy and Charging Rules Function, policy and charging rules function) entity, and then the PCRF determines what kind of policy should be formulated according to a terminal model that corresponds to the IMEISV.

In the process of implementing the present invention, the invention finds at least the following problems in the prior art.

When a PC (Personal Computer, personal computer) user uses a mobile phone as a MODEM (modem) to access the network, the GGSN obtains the IMEISV of the mobile phone. The IMEISV is the same as the IMEISV reported when the mobile phone directly surfs the Internet. As a result, it cannot be distinguished whether a mobile phone or a PC is used to surf the Internet, leading to inappropriateness of the policy formulated on the PCRF.

SUMMARY OF THE INVENTION

Embodiments of the present invention provide a policy formulating method, a policy server, and a gateway to determine a type of a terminal used by a user for accessing the Internet and to formulate a corresponding policy.

According to one aspect, an embodiment of the present invention provides a policy formulating method, including receiving, by a policy server, User-Agent user agent information sent by a gateway, where the User-Agent information carries type information of a terminal or type information of a browser used by a terminal, determining, by the policy server, a type of the terminal according to the User-Agent information, and formulating, by the policy server, a charging policy and/or a QoS quality of service policy according to the type of the terminal.

Correspondingly, an embodiment of the present invention provides a policy server, including a receiving unit, configured to receive User-Agent user agent information sent by a gateway, where the User-Agent information carries type information of a terminal or type information of a browser used by a terminal, a determining unit, configured to determine a type of the terminal according to the User-Agent information, and a formulating unit, configured to formulate a charging policy and/or a QoS quality of service policy according to the type of the terminal.

According to another aspect, an embodiment of the present invention provides a policy formulating method, including parsing, by a gateway, a packet sent by a terminal to acquire User-Agent user agent information, where the User-Agent carries type information of a terminal or type information a browser used by a terminal, and sending, by the gateway, the User-Agent information to a policy server.

Correspondingly, an embodiment of the present invention provides a gateway, including a parsing unit, configured to parse a packet sent by a terminal to acquire User-Agent user agent information, where the User-Agent information carries type information of a terminal or type information a browser used by a terminal, and a sending unit, configured to send the User-Agent information to a policy server.

It can be seen from the technical solutions provided in the embodiments of the present invention that, type information of a user terminal or type information of a browser used by a terminal is reported to a policy server; the policy server is capable of correctly distinguishing a terminal type, for example a mobile phone or a PC is surfing the Internet, and then the policy server formulates a corresponding policy to implement Internet access charging and QoS guarantee.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following descriptions show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
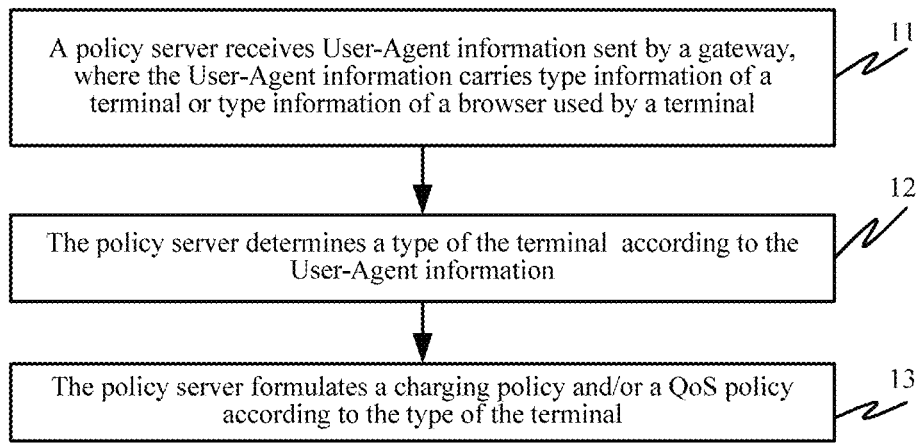
FIG. 1 is a schematic flowchart of a policy formulating method according to an embodiment of the present invention.

As shown in FIG. 1, an embodiment of the present invention provides a policy formulating method, including:

Step 11: A policy server receives User-Agent (user agent) information sent by a gateway, where the User-Agent information carries type information of a terminal or type information of a browser used by a terminal.

Step 12: The policy server determines a type of the terminal according to the User-Agent information.

Step 13: The policy server formulates a charging policy and/or a QoS (Quality of Service, quality of service) policy according to the type of the terminal.

The policy server may include but is not limited to a PCRF (Policy and Charging Rules Function, policy and charging rules function) entity. A network element that is in another network and is capable of implementing service subscription and user policy formulating and delivery can also be applied.

The gateway may include but is not limited to a GGSN (Gateway GPRS Support Node, gateway GRPS support node). A network element that is in another network and is capable of implementing a service centralization convergence point and performing content parsing on a service flow accessed by a user terminal can also be applied.

According to HTTP (Hyper Text Transfer Protocol, Hyper Text Transfer Protocol) specifications, when a user terminal performs an HTTP service, a packet sent by the terminal carries the User-Agent information.

When a PC (such as a notebook computer) user and a mobile phone user surf the Internet in wireless mode, packets carry different User-Agent information according to different locations of HTTP-based protocol stacks. The User-Agent information carries the type information of the terminal, for example a mobile phone or a PC is surfing the Internet. Alternatively, the User-Agent information carries the information about the type of the browser used by the terminal, for example browsers used by a mobile phone or a PC to surf the Internet are different. Therefore, the User-Agent information can be judged so that the type of a device used by the user terminal can be identified.

It can be seen from the technical solution provided in the embodiment of the present invention that, user terminal type information or type information of a browser used by a terminal is reported to a policy server; the policy server is capable of correctly distinguishing a terminal type, for example a mobile phone or a PC is surfing the Internet, and then the policy server formulates a corresponding policy to implement Internet access charging and QoS guarantee.

Specifically, in step 11, the User-Agent information may carry the type information of the terminal and the information about the type of the browser used by the terminal.

In step 12, the policy server may directly determine the type of the terminal according to the type information of the terminal in the User-Agent information. Alternatively, the policy server may further determine the type of the terminal according to the information about the type of the browser used by the terminal in the User-Agent information.

Exemplarily, more traffic exhaustion arises when a PC is used to surf the Internet, and therefore a carrier may prohibit using of this type of terminals. Therefore, when the policy server determines that the type of the terminal is a PC in step 12, the policy server formulates a corresponding charging policy and/or QoS policy for the PC terminal in step 13, and it may be that in certain packages, only a mobile phone terminal is allowed to use an embedded browser to surf the Internet but it is not allowed to use a PC as a client to connect to a data card or use a mobile phone to surf the Internet. However, the charging policy and/or the QoS policy formulated by the policy server is not limited herein.

The policy formulating method according to the embodiment of the present invention may further include determining, by the policy server according to subscription information of a terminal, that a type of a terminal needs to be determined, and registering, by the policy server, a User-Agent information reporting event on the gateway.

In this way, the gateway responds to the User-Agent information reporting event and sends the User-Agent information to the policy server, and then the process goes to step 11.

After step 11, the policy formulating method according to the embodiment of the present invention may further include canceling, by the policy server, the User-Agent information reporting event on the gateway.

In this way, pressure of packet processing on the gateway can be relieved.

The policy formulating method according to the embodiment of the present invention may further include delivering, by the policy server, the charging policy and/or the QoS quality of service policy to the gateway and performing, by the gateway, the policy and notifying the policy to the user terminal. Details are not repeated herein.

Figure 2:
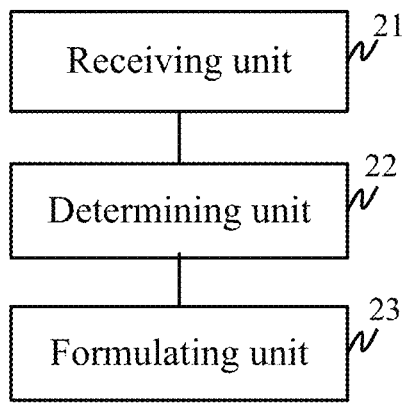
FIG. 2 is a first schematic structural diagram of a policy server according to an embodiment of the present invention.

As shown in FIG. 2, corresponding to the policy formulating method according to the embodiment shown in FIG. 1, an embodiment of the present invention provides a policy server, including a receiving unit 21, configured to receive User-Agent user agent information sent by a gateway, where the User-Agent information carries type information of a terminal or type information of a browser used by a terminal, a determining unit 22, configured to determine a type of the terminal according to the User-Agent information, and a formulating unit 23, configured to formulate a charging policy and/or a QoS quality of service policy according to the type of the terminal.

The policy server may include but is not limited to a PCRF entity. A network element that is in another network and is capable of implementing service subscription and user policy formulating and delivery can also be applied.

The gateway may include but is not limited to a GGSN. A network element that is in another network and is capable of implementing a service centralization convergence point and performing content parsing on a service flow of user terminal access can also be applied.

When a PC (such as a notebook computer) user and a mobile phone user surf the Internet in wireless mode, packets carry different User-Agent information according to different locations of HTTP-based protocol stacks. The User-Agent information carries the terminal type information, for example a mobile phone or a PC is surfing the Internet. Alternatively, the User-Agent information carries the information about the type of the browser used by the terminal, for example browsers used by a mobile phone or a PC to surf the Internet are different. Therefore, the policy server may judge the User-Agent information to identity the type of a device used by the user terminal.

It can be seen from the technical solution provided in the embodiment of the present invention that, type information of a user terminal or type information of a browser used by a terminal is reported to a policy server; the policy server is capable of correctly distinguishing a terminal type, for example a mobile phone or a PC is surfing the Internet, and then the policy server formulates a corresponding policy to implement Internet access charging and QoS guarantee.

Figure 3:
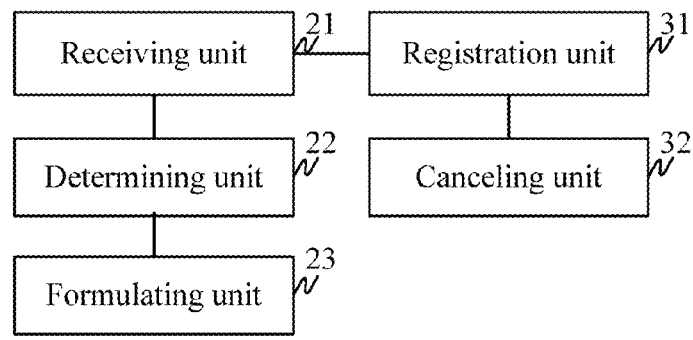
FIG. 3 is a second schematic structural diagram of a policy server according to an embodiment of the present invention.

As shown in FIG. 3, the policy server according to the embodiment of the present invention may further include a registration unit 31, configured to determine, according to subscription information of a terminal, that a type of a terminal needs to be determined and register a User-Agent information reporting event on the gateway, and a canceling unit 32, configured to cancel the User-Agent information reporting event on the gateway after the User-Agent information sent by the gateway is received.

The policy server according to the embodiment of the present invention further delivers the charging policy and/or the QoS quality of service policy to the gateway and the gateway performs the policy and notifies the policy to the user terminal. Details are not repeated herein.

Figure 4:
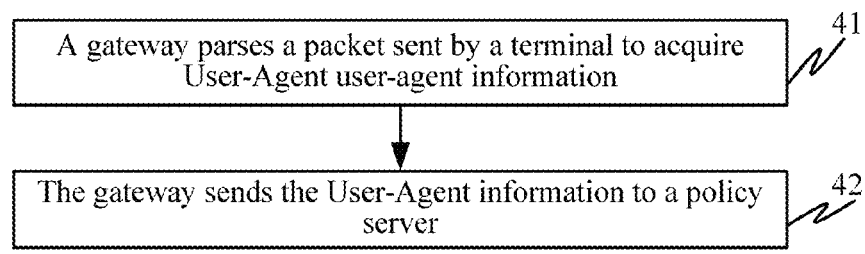
FIG. 4 is a schematic flowchart of a policy formulating method according to another embodiment of the present invention.

As shown in FIG. 4, an embodiment of the present invention provides a policy formulating method, including:

Step 41: A gateway parses a packet sent by a terminal to acquire User-Agent user agent information, where the User-Agent information carries type information of a terminal or type information of a browser used by a terminal.

Step 42: The gateway sends the User-Agent information to a policy server.

The policy server may include but is not limited to a PCRF entity. A network element that is in another network and is capable of implementing service subscription and user policy formulating and delivery can also be applied.

The gateway may include but is not limited to a GGSN. A network element that is in another network and is capable of implementing a service centralization convergence point and performing content parsing on a service flow of user terminal access can also be applied.

When a PC (such as a notebook computer) user and a mobile phone user surf the Internet in wireless mode, packets carry different User-Agent information according to different locations of HTTP-based protocol stacks. The User-Agent information carries the terminal type information, for example a mobile phone or a PC is surfing the Internet. Alternatively, the User-Agent information carries the information about the type of the browser used by the terminal, for example browsers used by a mobile phone or a PC to surf the Internet are different. Therefore, the policy server may judge the User-Agent information to identity the type of a device used by the user terminal.

It can be seen from the technical solution provided in the embodiment of the present invention that, type information of a user terminal or type information of a browser used by a terminal is reported to a policy server; the policy server is capable of correctly distinguishing a terminal type, for example a mobile phone or a PC is surfing the Internet, and then the policy server formulates a corresponding policy to implement Internet access charging and QoS guarantee.

Specifically, step 41 where the gateway parses the packet sent by the terminal to acquire the User-Agent user agent information may include performing, by the gateway, DPI (Deep Packet Inspection, deep packet inspection) on the packet sent by the terminal to acquire the User-Agent user agent information.

The policy formulating method according to the embodiment of the present invention may further include responding, by the gateway, to User-Agent information reporting event registration of the policy server and triggering parsing on the packet sent by the terminal to acquire the User-Agent user agent information.

The policy formulating method according to the embodiment of the present invention may further include receiving, by the gateway, the charging policy and/or the QoS quality of service policy delivered by the policy server and notifying the policy to the user terminal.

As can be seen from the above, the gateway is responsible for end-to-end policy notification. Details are not repeated herein.

Figure 5:
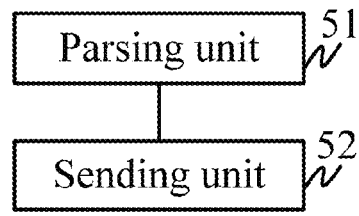
FIG. 5 is a first schematic structural diagram of a gateway according to an embodiment of the present invention.

As shown in FIG. 5, corresponding to the policy formulating method according to the embodiment shown in FIG. 4, an embodiment of the present invention provides a gateway, including a parsing unit 51, configured to parse a packet sent by a terminal to acquire User-Agent user agent information, where the User-Agent information carries type information of a terminal or type information of a browser used by a terminal, and a sending unit 52, configured to send the User-Agent information to a policy server.

The policy server may include but is not limited to a PCRF entity. A network element that is in another network and is capable of implementing service subscription and user policy formulating and delivery can also be applied.

The gateway may include but is not limited to a GGSN. A network element that is in another network and is capable of implementing a service centralization convergence point and performing content parsing on a service flow of user terminal access can also be applied.

When a PC (such as a notebook computer) user and a mobile phone user surfs the Internet in wireless mode, packets carry different User-Agent information according to different locations of HTTP-based protocol stacks. The User-Agent information carries the terminal type information, for example a mobile phone or a PC is surfing the Internet. Alternatively, the User-Agent information carries the information about the type of the browser used by the terminal, for example, browsers used by a mobile phone or a PC to surf the Internet are different. Therefore, the policy server may judge the User-Agent information to identity the type of a device used by the user terminal.

It can be seen from the technical solution provided in the embodiment of the present invention that, type information of a user terminal or type information of a browser used by a terminal is reported to a policy server; the policy server is capable of correctly distinguishing a terminal type, for example a mobile phone or a PC is surfing the Internet, and then the policy server formulates a corresponding policy to implement Internet access charging and QoS guarantee.

Specifically, the parsing unit 51 is configured to perform DPI deep packet inspection on the packet sent by the terminal to acquire the User-Agent user agent information.

Figure 6:
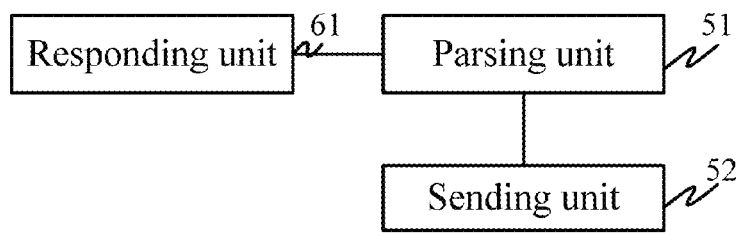
FIG. 6 is a second schematic structural diagram of a gateway according to an embodiment of the present invention.

As shown in FIG. 6, the gateway according to the embodiment of the present invention may further include a responding unit 61, configured to respond to a User-Agent information reporting event registration of the policy server and trigger the parsing unit 51.

The gateway according to the embodiment of the present invention is further configured to receive the charging policy and/or the QoS quality of service policy delivered by the policy server and notify the policy to the user terminal.

Figure 7:
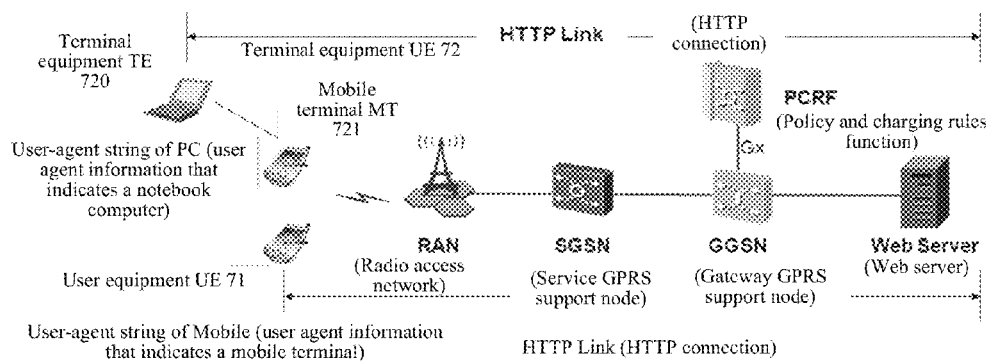
FIG. 7 is a schematic diagram of an application scenario of a policy formulating method according to an embodiment of the present invention.

As shown in FIG. 7, in an application scenario that a user surfs the Internet in wireless mode, UE (User Equipment, user equipment) 71 is a mobile phone, UE 71 establishes an HTTP connection with a Web server, and a packet sent by UE 71 carries User-Agent information User-agent string of Mobile to indicate a mobile terminal.

When TE (Terminal Equipment, terminal equipment) 720 uses MT (Mobile Terminal, mobile terminal) 721 as a modem to surf the Internet, TE 720 and MT 721 jointly form UE 72. UE 72 establishes an HTTP connection with the Web server and a packet sent by UE 72 carries User-Agent information User-agent string of PC to indicate a PC.

Figure 8:
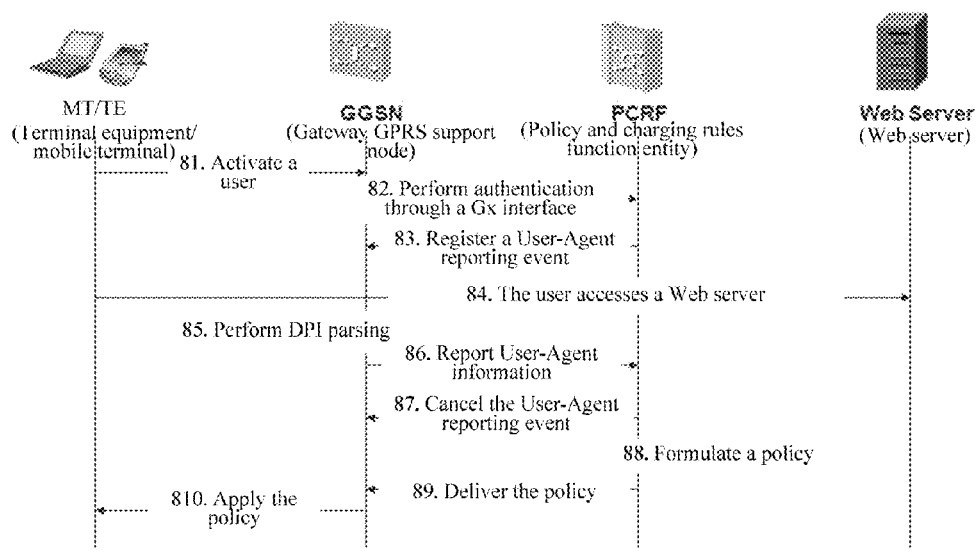
FIG. 8 is a schematic flowchart in the application scenario in FIG. 7.

As shown in FIG. 8, a policy formulating method according to an embodiment of the present invention includes:

81. Activate a user terminal.

82. A GGSN is authenticated on a PCRF through a Gx interface.

83. The PCRF determines, according to subscription information of the user, whether a type of the user terminal needs to be known. If the type of the user terminal needs to be known, the PCRF registers a User-Agent reporting event on the GGSN.

84. The user terminal accesses a Web server.

85. The GGSN enables a DPI capability to parse user traffic. When finding an HTTP packet, the GGSN acquires User-Agent field content from the packet through DPI parsing.

86. The GGSN reports the User-Agent field content to the PCRF.

87. After obtaining the User-Agent field content, the PCRF performs cancellation of the User-Agent reporting event. This step is an optional step. The cancellation of the User-Agent reporting event may relieve processing pressure on the GGSN.

88. The PCRF determines a type of a terminal according to the User-Agent field content. If it can be correctly distinguished whether a mobile phone or a PC surfs the Internet, the PCRF formulates a charging policy and/or a QoS policy according to the type information of the terminal.

89. The PCRF delivers the policy to the GGSN.

810. The GGSN applies the policy to the user terminal.

It can be seen from the technical solution provided by the embodiment of the present invention that, type information of a user terminal is reported to a policy server; the policy server is capable of correctly distinguishing a terminal type, for example a mobile phone or a PC is surfing the Internet, and then the policy server formulates a corresponding policy to implement Internet access charging and QoS guarantee.

It should be noted that, for the methods according to the embodiments, for purposes of simplicity of explanation, the methods are described as a combination of a series of actions, but it should be clear to persons skilled in the art that the present invention is not limited by the order of the actions, as some steps can, in accordance with the present invention, be performed in other orders or concurrently. Next, persons skilled in the art should also know that, the embodiments described in the specification all fall within exemplary embodiments, and the related actions and modules are not necessarily required by the present invention.

In the embodiments, description for the embodiments has its own emphasis, and a part without being described in detail in a certain embodiment can be obtained with reference to relevant description in other embodiments.

Persons of ordinary skill in the art may understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (Read-Only Memory, ROM), or a random access memory (Random Access Memory, RAM). The foregoing descriptions are merely exemplary specific embodiments of the present invention, but are not intended to limit the protection scope of the present invention. Various modifications and replacements that can be easily thought of by persons skilled in the art without departing from the technical scope of the present invention should be considered falling within the protection scope of the present invention. Therefore, the protection scope of the present invention shall be subject to the protection scope of the claims.

What is claimed is:

1. A policy formulating method comprising:

performing, by a gateway, Deep Packet Inspection (DPI) on a packet sent by a terminal to acquire user agent information and sending the user agent information to a policy server;

receiving, by the policy server, the user agent information sent by the gateway, wherein the user agent information carries a terminal type information or a browser type information used by the terminal accessing a wireless network;

registering, by the policy server, a user agent information reporting event on the gateway;

determining, by the policy server, whether the terminal is a mobile phone directly accessing the wireless network or a personal computer using a mobile phone as a modem to indirectly access the wireless network according to the user agent information;

formulating, by the policy server, a charging or quality of service (QoS) policy according to whether the terminal is a mobile phone directly accessing the wireless network or is a personal computer using a mobile phone as a modem to indirectly access the wireless network;

delivering, by the policy server, the charging or QoS policy to the gateway and performing, by the gateway, the policy and notifying the policy to the user terminal; and wherein the charging or QoS policy prohibits the terminal from accessing the Internet when the terminal is a personal computer using a mobile phone as a modem to indirectly access the wireless network, and wherein the charging or QoS policy permits the terminal to access the Internet when the terminal is a mobile phone directly accessing the Internet.

2. The policy formulating method according to claim 1, after the receiving, by the policy server, the user agent information sent by the gateway, further comprising:

canceling, by the policy server, the user agent information reporting event on the gateway.

3. The method according to claim 1, wherein a different charging or QoS policy is formulated when the terminal is a mobile phone directly accessing the wireless network than when the terminal is a personal computer using a mobile phone as a modem to indirectly access the wireless network.

4. The method according to claim 1, wherein the charging or QoS policy provides a different QoS guarantee for the terminal when the terminal is a mobile phone directly accessing the wireless network than when the terminal is a personal computer using a mobile phone as a modem to indirectly access the wireless network.

5. The method according to claim 1, wherein the charging or QoS policy specifies a different Internet access charge for the terminal when the terminal is a mobile phone directly accessing the wireless network than when the terminal is a personal computer using a mobile phone as a modem to indirectly access the wireless network.

6. The method according to claim 1, wherein the policy server is a policy and charging rules function (PCRF) entity.

7. The method according to claim 1, wherein the gateway is a gateway general packet radio service (GPRS) support node (GGSN).

8. A policy server comprising:

a processor; and a non-transitory computer readable storage medium coupled to the processor and storing programming for execution by the processor, the programming including instructions to:

receive user agent information sent by a gateway, wherein the user agent information carries a terminal type information or a browser type information associated with a terminal accessing a wireless network, and wherein Deep Packet Inspection (DPI) was performed on the packet by the gateway;

register a user agent information reporting event on the gateway;

determine whether the terminal is a mobile phone directly accessing the wireless network or a personal computer using a mobile phone as a modem to indirectly access the wireless network according to the user agent information;

formulate a charging or a quality of service (QoS) policy according to whether the terminal is a mobile phone directly accessing the wireless network or a personal computer using a mobile phone as a modem to indirectly access the wireless network; and deliver the charging or QoS policy to the gateway and performing, by the gateway, the policy and notifying the policy to the terminal;

wherein the charging or QoS policy prohibits the terminal from accessing the Internet when the terminal is a personal computer using a mobile phone as a modem to indirectly access the wireless network, and wherein the charging or QoS policy permits the terminal to access the Internet when the terminal is a mobile phone directly accessing the Internet.

9. The policy server according to claim 8, wherein the programming further includes instructions to:

cancel the user agent information reporting event on the gateway after the user agent information sent by the gateway is received.

10. The policy server according to claim 8, wherein a different charging or QoS policy is formulated when the terminal is a mobile phone directly accessing the wireless network than when the terminal is a personal computer using a mobile phone as a modem to indirectly access the wireless network.

11. The policy server according to claim 8, wherein the charging or QoS policy provides a different QoS guarantee for the terminal when the terminal is a mobile phone directly accessing the wireless network than when the terminal is a personal computer using a mobile phone as a modem to indirectly access the wireless network.

12. The policy server according to claim 8, wherein the charging or QoS policy specifies a different Internet access charge for the terminal when the terminal is a mobile phone directly accessing the wireless network than when the terminal is a personal computer using a mobile phone as a modem to indirectly access the wireless network.

13. The policy server according to claim 8, wherein the policy server is a policy and charging rules function (PCRF) entity.

14. The policy server according to claim 8, wherein the gateway is a gateway general packet radio service (GPRS) support node (GGSN).

* * * * *